UNITED STATES PATENT OFFICE.

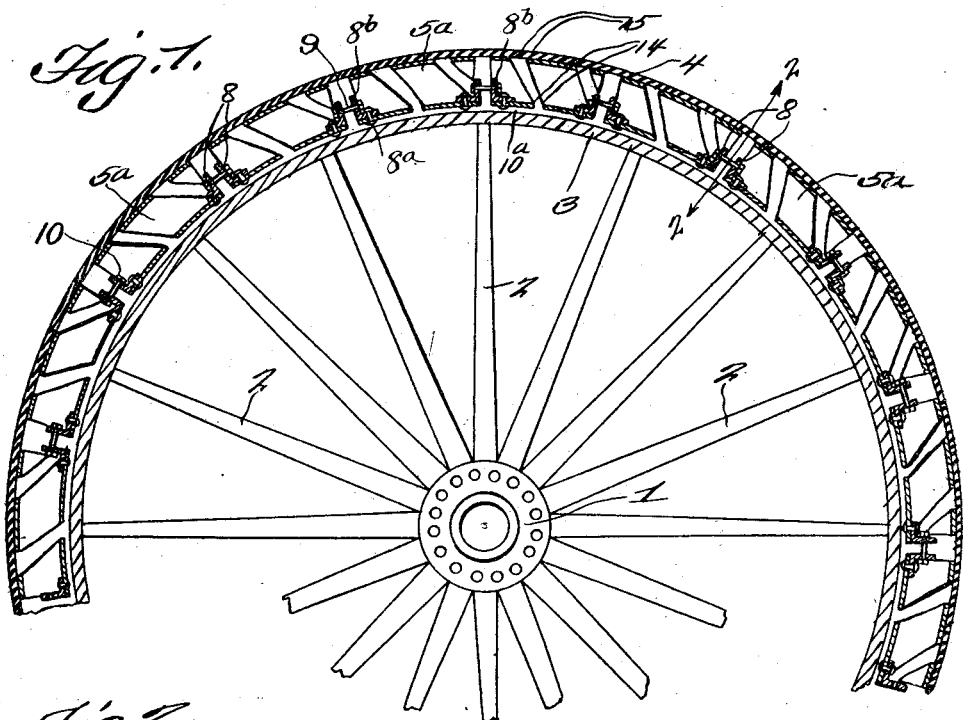

EMIL RADKE, OF BLUE EARTH, MINNESOTA.

RESILIENT TIRE.

1,132,031.

Specification of Letters Patent.  Patented Mar. 16, 1915.

Application filed April 24, 1914.  Serial No. 834,182.

*To all whom it may concern:*

Be it known that I, EMIL RADKE, a citizen of the United States, residing at Blue Earth, in the county of Faribault and State of Minnesota, have invented a new and useful Resilient Tire; and I do hereby declare the following to be a full, clear, and exact description of the invention, such as will enable others skilled in the art to which it appertains to make and use the same.

This invention relates to a new and useful resilient wheel tire.

An object of the invention is the provision of a tire of this design, comprising a series of spring coil sections arranged in the usual autowheel tire casing, and joined in sequence, and to be substituted in lieu of the usual pneumatic tire.

The invention comprises further features and combination of parts, as hereinafter set forth, shown in the drawings and claimed.

In the drawings:—Figure 1 is a sectional view through a portion of an automobile wheel tire, showing the same constructed in accordance with the invention. Fig. 2 is a transverse sectional view on line 2—2 of Fig. 1. Fig. 3 is a detail perspective view of one of the coil spring sections.

Referring more especially to the drawings, 1 designates the usual form of hub having spokes 2, which are connected to the ordinary form of clench rim 3, on which is arranged the usual outer tire casing 4. This casing 4 is held on the rim 3 by the clench flanges 5.

Arranged on the interior of the casing 4 is a series of coil spring sections 5 constructed of spring sheet metal. Each end of each section has an angular plate 8 connected to it at $8^a$. The radially extending portions $8^b$ of said angular plates are provided with slots or openings 13, and passing through said slots of the adjacent lateral portions $8^b$ of said plates are bolts 9 having nuts 10, thereby joining the several spring coil sections in sequence. The opposite edges 14 of the convolutions of each section are closer together than the opposite edges 15. Each section comprises three convolutions formed of the spring sheet metal, the central convolution $5^a$ and the two end convolutions $5^b$. The central convolution is extremely broad, substantial, firm, and mobile, yet there is sufficient amount of resiliency to enable the tire to yield and then resume its normal shape. The end convolutions $5^b$ gradually taper off as shown, and their extremities are free, that is, unattached, thereby insuring resiliency.

In arranging the spring coil sections in the tire, and in sequence as shown in the drawings, one part $10^a$ of the tire casing 4 is placed in engagement with one of the clench flanges 5. The several spring coil sections are then connected as shown and placed about the rim 3 of the wheel, inside the casing 4. In placing the series or chain of sections about the rim, it is necessary to stretch the series of springs sufficiently so as to pass over the other clench flange 5. The opposite part $10^a$ of the casing is then folded over the series of springs or coil sections, and subsequently the coil sections are pushed toward one side, by bearing upon the outer side surface of the casing 4, sufficiently so that the said opposite parts $10^a$ of the casing 4 may be forced in engagement with the other clench flange 5. However, before forcing the casing 4 in place as above stated, the nuts upon said bolts 9 are adjusted sufficiently to bring the sections requisitely close together, whereby after the casing 4 has been forced in engagement with the flanges 5 of said rim 3, the spring coil sections will bear laterally outwardly upon the parts $10^a$ and keep them in engagement with the clench flanges 5. In this manner the resilient tire is constructed, and this structure has been found comparatively practical and essential.

The invention having been set forth, what is claimed as new and useful is:—

1. In combination, a wheel clench rim, a tire casing therefor, a series of circumferentially extending coil spring sections constructed of spring sheet metal, means for connecting the sections in sequence, said series of spring coil sections being incased in the tire casing and acting to hold the tire casing in engagement with the clench flanges of the rim, each spring section comprising a central broad convolution and two end convolutions, which are spaced apart from the central convolution, said end convolutions being gradually tapered off toward their extremities and being free, said tapered off free end convolutions lying transversely of the tread of the tire and terminating adjacent where the sections are connected.

2. A resilient filler for a tire casing comprising a series of circumferentially extended spring coil sections constructed of spring sheet metal, each section comprising a central convolution, and two end convolutions, means for connecting the sections in sequence, said means comprising lugs secured to the adjacent portions of the central convolutions of the sections, said lugs having transversely disposed elongated slots, means passing through the slots to connect the lugs, said end convolutions being gradually tapered off toward their extremities and being free, and lying and extending transversely of the tread of the tire and terminating adjacent where the sections are connected.

In testimony whereof I have signed my name to this specification in the presence of two subscribing witnesses.

EMIL RADKE.

Witnesses:
F. P. BROWN,
GEO. A. KING.